S. E. ROOT.

Clock-Dials.

No. 6,580.

Reissued Aug. 3, 1875.

WITNESSES

C. S. Wittingham

Robert M. Barr.

S. E. Root INVENTOR

By Leggett & Leggett Attorneys.

N. PETERS, PHOTO-LITHOGRAPHER, WASHINGTON, D. C.

UNITED STATES PATENT OFFICE.

S. EMERSON ROOT, OF BRISTOL, CONNECTICUT.

IMPROVEMENT IN CLOCK-DIALS.

Specification forming part of Letters Patent No. 23,950, dated May 10, 1859; extended seven years; reissue No. 6,580, dated August 3, 1875; application filed July 17, 1875.

*To all whom it may concern:*

Be it known that I, S. E. ROOT, of Bristol, county of Hartford and State of Connecticut, have invented a new and useful Improvement in Clock-Dials; and I do hereby declare that the following is a full, clear, and exact description thereof, such as will enable others skilled in the art to which my invention pertains to make and use it, reference being had to the accompanying drawings forming a part of this specification, in which—

Figure 1:
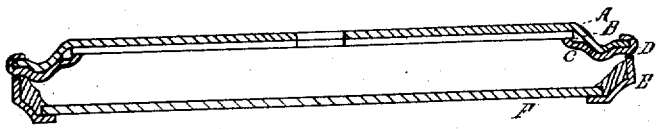
Figure 2:
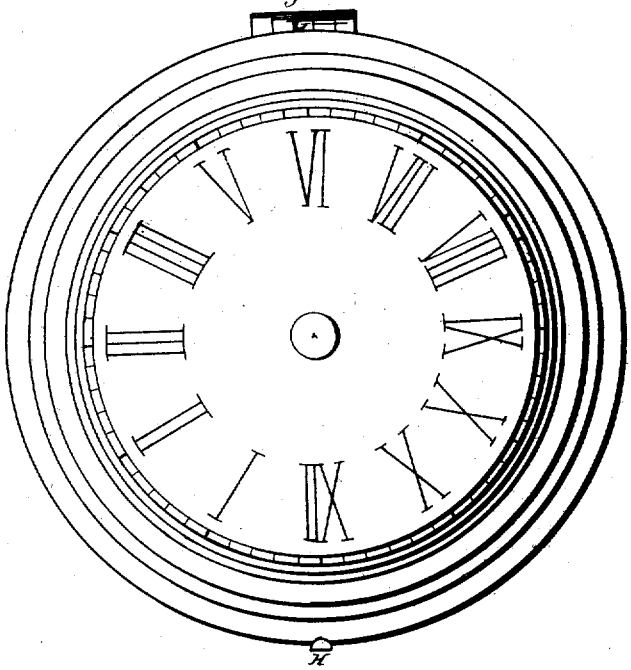

Figure 1 is a horizontal section, and Fig. 2 a face view.

The object of my invention is to improve the manufacture of clocks, whereby I may produce a durable article, which, at the same time, shall embody both richness of appearance and economy of manufacture.

A second object of my invention is, by skillfully selecting material and dividing labor, to accomplish the most execution within a given time, while I thereby turn out a durable and useful article that is least liable to injury, and at greatly reduced rates.

The nature of this improvement relates to only one of the various parts or branches in the manufacture of clocks.

Referring to the drawings, A is a wood, composition, or metallic back. B is a paper dial. C is a curved or ornamental frame or scalp. E is the sash secured to the frame by a joint, G, and held closed by a catch, H.

The back A may be made entirely flat, if desired. The dial B may be made of the same diameter as the back, and the frame made plain and turned over the edges of the dial and back, thus compressing them firmly together.

When it is desired to make a molding frame and back, the edge of the back is made nearly the shape of the frame. The dial B is made of such diameter as to just fill between the raised portion from the flat surface of the back A. The frame or scalp C is placed over the dial B and the edge D turned over the edge of the back A and pressed together, thus firmly compressing the edge of the dial between the inner edge of the frame C and back A.

From the above it will be seen that I am enabled to produce a cheap and attractive article, which has both the requisites of usefulness and desirability. The simplicity of its construction, the rapidity with which any number can be made and furnished for use, and at the same time being fully equal, if not superior, to those made now, furnishes a strong element in its favor.

I do not claim a metallic back; nor do I claim a paper dial.

Heretofore iron and tin backs have been used, but without success, since it has been found that, owing to the oxidation of the aforesaid metals, the paper dial is discolored; but I have discovered that this latter objection is obviated by the use of a zinc back.

What I claim as new, and desire to secure by Letters Patent, is—

1. The combination of a metallic scalp with a clock-dial, substantially as and for the purpose described.
2. The combination of a metallic scalp and zinc back with a paper dial, substantially as and for the purpose shown.
3. The combination of a zinc back with a paper dial, substantially as and for the purpose set forth.
4. The combination of metallic back and paper dial with a rim of "struck up" sheet metal, substantially as and for the purpose described.
5. As a new article of manufacture, the combination of a clock-dial, B, metallic back A, and frame C, substantially as and for the purpose set forth.

S. EMERSON ROOT.

Witnesses:
HOBART A. WARNER,
WILBERT BARTHOLOMEW.

BEST AVAILABLE COPY